United States Patent [19]
Lee

[11] Patent Number: 5,431,429
[45] Date of Patent: Jul. 11, 1995

[54] SUSPENSION SYSTEM FOR VEHICLE

[75] Inventor: Unkoo Lee, Kyungki-do, Rep. of Korea

[73] Assignee: Hyundai Motor Company, Seoul, Rep. of Korea

[21] Appl. No.: 174,019

[22] Filed: Dec. 28, 1993

[30] Foreign Application Priority Data

Dec. 28, 1992 [KR] Rep. of Korea ............... 92-25851

[51] Int. Cl.⁶ .............................................. B60G 3/18
[52] U.S. Cl. ................................ 280/666; 280/670; 280/701; 280/724
[58] Field of Search ............... 280/690, 696, 701, 710, 280/663, 666, 667, 670

[56] References Cited

U.S. PATENT DOCUMENTS 2,303,545 12/1942 Graham, Jr. .................... 280/667
5,080,389 1/1992 Kawano et al. .................. 280/667

*Primary Examiner*—Kenneth R. Rice

[57] ABSTRACT

A suspension system for a vehicle including a knuckle pivotally supporting a wheel; upper and lower control arms connecting upper and lower parts of the knuckle to a car body or a subframe to vibrate upward and downward with respect to the car body; a crank lever including two arms formed at an obtuse angle, centering on a hinge, and turning by ascent and descent of the upper control arm, with one-side arm of the arms being connected to the upper control arm connected to the car body by inserting a connecting link therein; and a strut assembly disposed laterally to the car body or the subframe and controlling turning movement of the crank lever by ascent and descent of the wheel to absorb vibration and impact applied to the wheel from the road surface.

4 Claims, 3 Drawing Sheets

SUSPENSION SYSTEM FOR VEHICLE

BACKGROUND OF THE INVENTION

1. Field of the Invention

The present invention relates to a suspension system of a vehicle. More particularly, it relates to a suspension system which can enhance riding comfort by a buffer that is disposed laterally and absorbs vibration during upward and downward movement of a vehicle, and ensures the reduction in shock that affects the vehicle body and can cope with a minute vibration by making a displacement of the buffer larger than a displacement of a wheel.

2. Description of Related Art

A suspension for a vehicle connects an axle shaft and a car body to each other, and controls a position of a tire with respect to the car body for its optimal position during running of the vehicle. Thus, optimal handling safety may be obtained, and the axle shaft is prevented from directly transmitting impact or vibration from a road surface to the car body. The suspension prevents damage of baggage, thereby improving riding comfort.

Further, the suspension should be designed to absorb vibration or impact from the road surface as well as obtain running safety by maintaining an optimal position of a vehicle's straight ahead position and handling safety of a vehicle's turning position.

The suspension system is structurally characterized as an integral shaft suspension and an independent suspension. The suspension of the present invention concerns an independent suspension, and there are McPherson strut type and Wishbone type suspension systems, as independent suspensions.

The McPherson strut type suspension system comprises a strut arm 75, a shock absorbing means, consisting of a shock absorber 71 and a spring 72 and having a lower part fixed to a knuckle 73 pivotally supporting a wheel 70 and an upper part supported to a car body 74; and a lower control arm 76 connecting a lower part of the knuckle 73 to a lower part of the car body 74, as shown in FIG. 5A.

The Wishbone type suspension system, as shown in FIG. 5B, includes a knuckle 81 supporting a wheel 80 having upper and lower parts and connected to a subframe or a car body 84 by upper and lower control arms 82, 83, respectively and a spring 85, as absorbing means, disposed between the upper and lower control arms 82, 83.

The above-mentioned two kinds of the conventional suspension systems includes in common a buffer mounted vertically or disposed with a little inclination. Since the shock received by the wheel is directly transmitted to the car body vertically via the buffer, there is a limit to the release of the shock and the enhancement in the riding comfort.

In addition, the suspension system is designed to have a spring rate of the buffer larger than a wheel rate or a suspension rate, and the controlling function against the minute displacement is not precise at an initial stage. Thus, the conventional suspension systems have a problem of not being able to cope with a minute vibration.

SUMMARY OF THE INVENTION

Accordingly, the present invention is created in order to solve the problems as mentioned above.

It is an object of the present invention to provide a suspension system which can enhance riding comfort by absorbing vibrations during upward and downward movement of a vehicle by means of a buffer disposed in a transverse direction with respect to a car body.

It is another object of the present invention to provide a suspension system which ensures the reduction in shock that affects the vehicle body and can cope with a minute vibration by making a displacement of the buffer larger than a displacement of a wheel.

To achieve the above objects, the present invention provides a suspension system for a vehicle comprising:

a knuckle pivotally supporting a wheel;

upper and lower control arms connecting upper and lower parts of said knuckle to a car body or a subframe to vibrate upward and downward with respect to the car body;

a crank lever including two arms formed at an obtuse angle, centering on a hinge, and turning by ascent and descent of the upper control arm, with one-side arm of said arms being connected to the upper control arm connected to the car body by inserting a connecting link therein; and a strut assembly disposed laterally to the car body or the subframe and controlling turning movement of said crank lever by ascent and descent of the wheel to absorb vibration and impact applied to the wheel from the road surface.

In the suspension system according to the present invention, the upper control arm is formed in a U-shape and includes a connecting part connected to an upper part of said knuckle by a ball joint, and car body-side connecting parts diverging forward and backward are fixed to the car body or the subframe by a hinge by inserting an elastic bush therein.

The lower control arm is formed in a Y-shape and includes connecting parts diverging forward and backward, and a car body-side connecting part of said connecting parts is connected to the car body or the subframe and a wheel-side connecting part is connected to a lower part of the knuckle by a ball joint.

The crank lever includes two arms formed at an obtuse angle, and a length a of the upper-side arm is larger than a length b of the one-side arm and the ratio b:a is larger than 1. The wheel-side connecting part of said strut assembly is disposed to be higher than the car body-side connecting part.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF PREFERRED EMBODIMENTS

Figure 1:
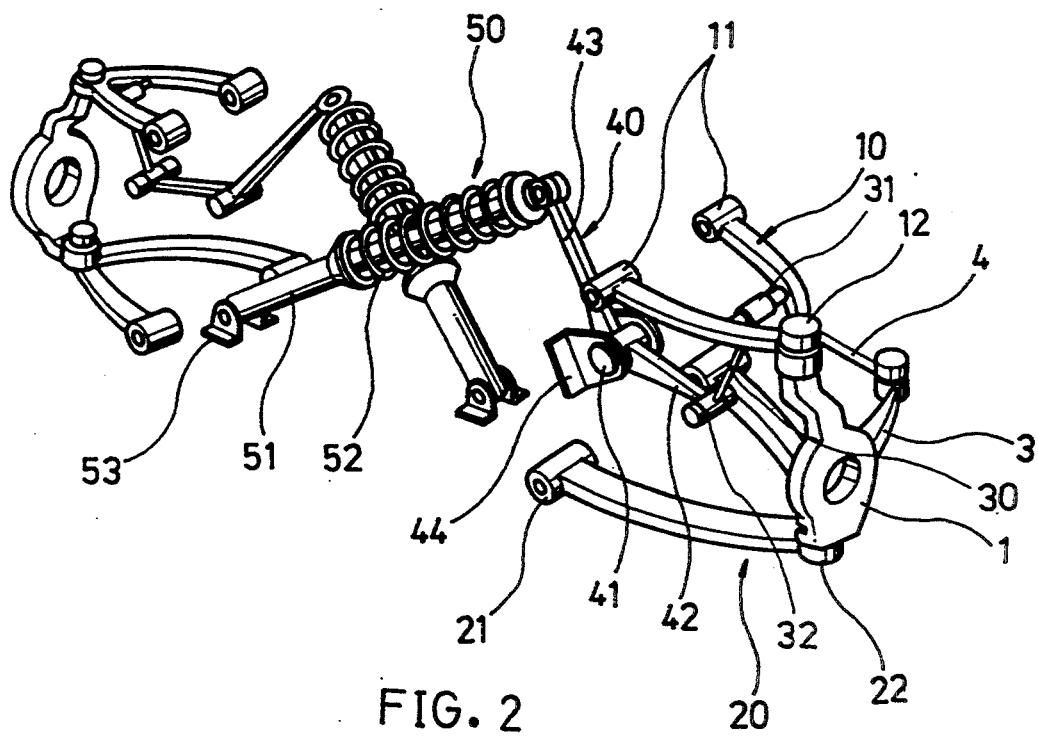
FIG. 1 is a perspective view of a suspension system in accordance with an embodiment of the present invention.
Figure 2:
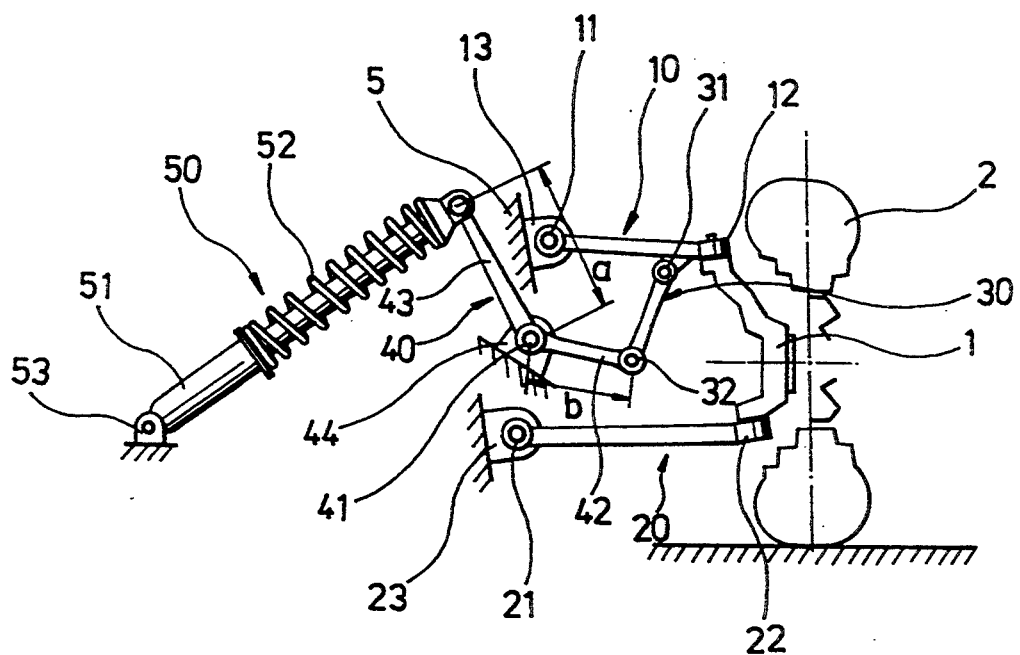
FIG. 2 is a front view of the suspension system in accordance with an embodiment of the present invention.
Figure 3:
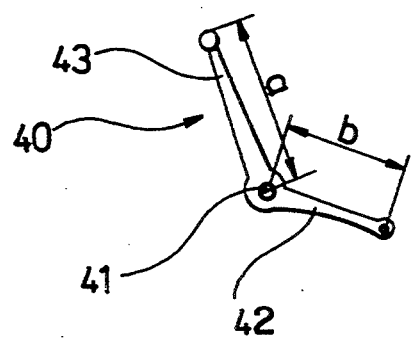
FIG. 3 is a front view of the suspension system in accordance with an embodiment of the present invention.

FIGS. 1 and 2 are respectively a perspective view and a front view in accordance with an embodiment of a suspension system of the present invention.

A knuckle 1 supports a wheel 2 pivotally, and upper and lower control arms 10, 20 are connected to a car body. If the knuckle 1 is applied to a steerable wheel, a protrusion 3 that protrudes backward is formed to be connected with a tie rod 4. Steering is performed by the action of this tie rod 4.

The upper control arm 10, connecting an upper part of the knuckle 1 to a car body or a subframe 5, is formed in a U-shape to include two car body-side connecting parts 11, and a wheel-side connecting part 12. The car body-side connecting parts 11 are connected with a bracket 13 mounted on the car body or a subframe 5. The wheel-side connecting part 12 is connected with an upper part of the knuckle 1 by a ball joint.

The lower control arm 20 connecting a lower part of the knuckle 1 to the car body or the subframe 5, is formed in a U-shape to include two car body-side connecting parts 21 connected with a bracket 23 mounted on the car body or the subframe 5 by a rubber bush, and a wheel-side connecting part 22 connected with the lower part of the knuckle 1 by a ball joint.

The rubber bushings formed on the car body-side connecting part of the upper and lower control arms 10, 20 is formed to have a predetermined elastic force such that the upper and lower control arms 10, 20 freely move upward and downward.

A connecting link 30 connected with a wheel-side bottom of the upper control arm 10 includes upper and lower connecting parts 31, 32 formed on opposite ends thereof. The upper connecting part 31 is connected to the upper control arm 10, and the lower connecting part 32 is connected to one side arm 42 of a crank lever 40 that will be described.

The connecting parts 31, 32 of the connecting link 30 may be connected by means of a simple hinge, and are connected by a rubber bush or a ball joint, preferably.

The crank lever 40 connected to the lower connecting part 32 of the connecting link 30 includes arms 42, 43 protruding respectively to one upper-side and the other side of a central hinge 41 by an obtuse angle. The hinge 41 is fixed by a bracket to the car body or the subframe 5 between the car body-side connecting parts 11, 21 of the upper and lower control arms 10, 20.

The upper-side arm 43 of the crank lever 40 is connected with a strut assembly 50 that will be described.

The upward and downward vibrations of the upper control arm 10 resulting from the vibration of the wheel 2 is transmitted to the crank lever 40 via the connecting link 30 such that the crank lever 40 can turn to the left and right when viewed from the front in FIG. 2.

The strut assembly 50 connected to the upper-side arm 43 of the crank lever 40 consists of a shock absorber 51 and a spring 52. A car body-side end of the strut assembly 50 is fixed by a hinge to a bracket 53 protruding from the central upper part of the subframe 5, and a wheel-side end of the strut assembly 50 is connected with the crank lever 40. Thus, the strut assembly 50 is formed laterally with respect to the car body, and the wheel-side end is disposed to be higher than the car body-side end such that the strut assembly 50 absorbs the shock transmitted through the crank lever 40.

Each wheel has the suspension system as mentioned above, and the disposition of the suspension system as to a right wheel and a left wheel is illustrated in FIG. 1.

In the crank lever 40 applied to the suspension system as mentioned above, a length a of the upper-side arm 43 is longer than a length b of the other-side arm 42 such that the ratio b:a is larger than 1.

Figure 4:
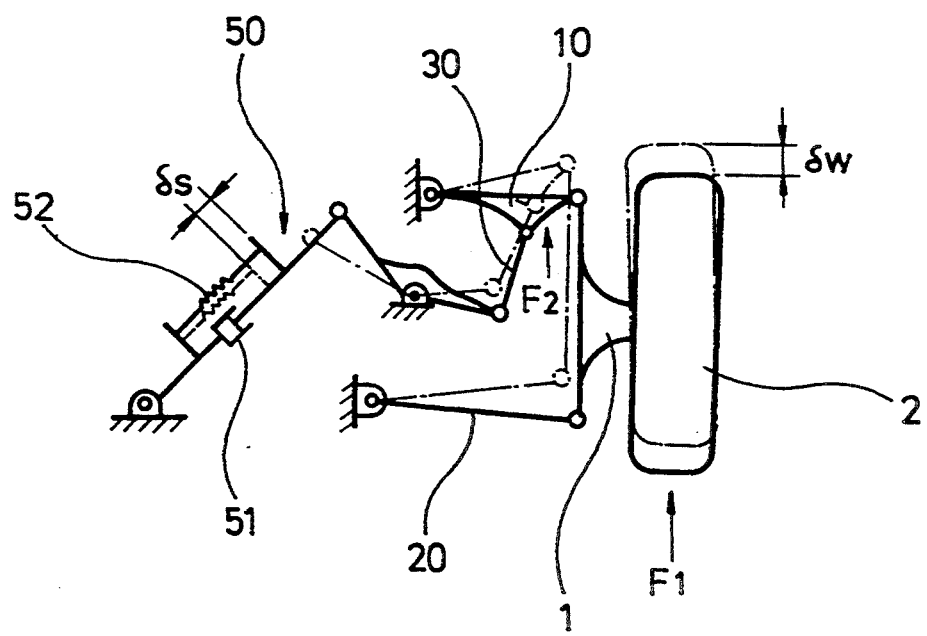
FIG. 4 depicts the operation of the suspension system in accordance with an embodiment of the present invention.
Figure 5A:
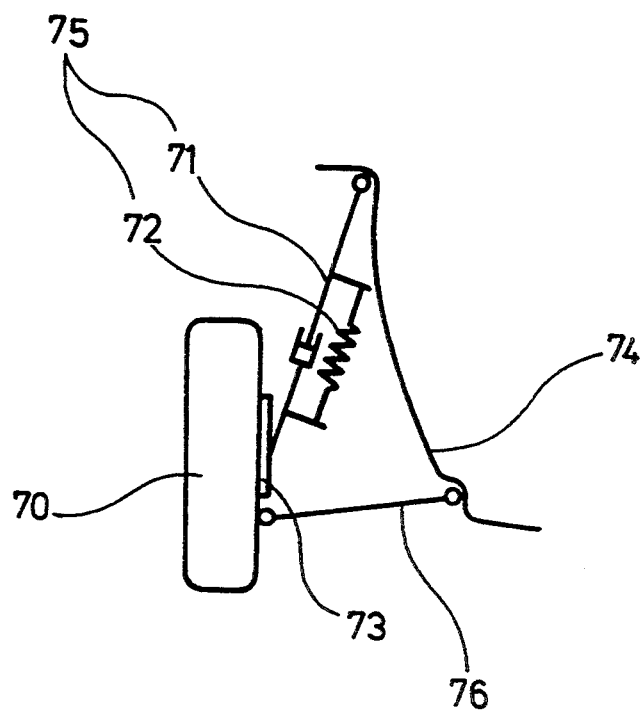
FIGS. 5A and 5B depict schematic constructions of conventional suspension systems.
Figure 5B:
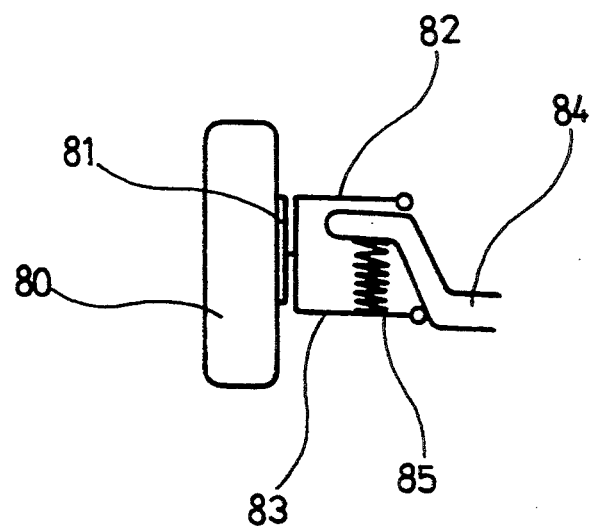

The reason why the length a of the upper-side arm 43 is longer than the length b of the other-side arm 42 is that a displacement δw of the wheel 2 is almost the same as a displacement δs of the strut assembly 50, as shown in FIG. 4, or the displacement δs of the strut assembly 50 is larger than the displacement δw of the wheel 2, whereby the car can cope with any minute vibration of the wheel 2, as a leverage, and the riding safety may be improved.

Force F1 applied to the wheel 2 from the road surface, as shown in FIG. 4, serves as the force for turning the wheel 2 and the upper and lower control arms 10, 20. The impact is first absorbed, and the force F1 first absorbing the impact passes the connecting link 30 connected with the upper control arm 10, and then acts as a vertical force F2 to draw the other-side arm 42 of the crank lever 40 upward.

The crank lever 40 turns counterclockwise, centering on the hinge 41, by the vertical force F2, and the vertical force F2 is transmitted to the strut assembly 50 by the ratio a:b between each length of the upper-side arm 43 and the other-side arm 42. The force F2 is released again in the strut assembly 50, and acts as force F3 to be transmitted to the car body or the subframe 5.

The force given from the road surface is released through several steps, and is transmitted to the car body or the subframe 5 in a state that the shock-absorption is finally performed by the strut assembly 50 disposed laterally. The impact transmitted to the car body is so small that the riding safety can be enhanced.

The strut assembly of the conventional suspension system is set upright, and the suspension system is designed to overcome the gravity of the vehicle. The spring rate of the strut assembly must be large but, in accordance with the present invention, the strut assembly 50 is disposed laterally, and the crank lever 40 interlocking is installed between the strut assembly 50 and the wheel 2. Thus, the spring rate of the strut assembly 50 may be set small.

Setting the spring rate of the strut assembly 50 small means that the displacement δs of the strut assembly is larger than the displacement δw of the wheel 2, during the upward and downward movement of the wheel 2. In conclusion, the suspension system of the car can cope with minute vibration, and has a great effect on controlling slight rolling.

In the case where the wheel descends, the force just operates the pertinent components in the contrary direction to that of the above-mentioned operation, and is transmitted to the car body in the same way as the above. Thus, the shock-absorbing effect is the same.

The present invention provides a suspension system which can enhance riding comfort by a buffer that is disposed laterally and absorbs vibration during upward and downward movement of a vehicle, and ensures the reduction in shock that affects the vehicle body and can cope with a minute vibration by making a displacement of the buffer larger than a displacement of a wheel.

Although preferred embodiments of the present invention have been described in detail hereinabove, it should be clearly understood that many variations and- /or modifications of the basic inventive concepts herein taught which may appear to those skilled in the pertinent art will still fall within the spirit and scope of the present invention, as defined in the appended claims.

What is claimed is:

1. A suspension for a vehicle, comprising:
   a knuckle pivotally supporting a wheel;
   upper and lower control arms connecting upper and lower parts of said knuckle to a car body, said upper and lower control arms vibrating upward and downward with respect to the car body;
   a crank lever including two arms formed at an obtuse angle, centering on a hinge, and turning by ascent and descent of the upper control arm;
   a connecting link inserted between and connected to the upper control arm and an outer end of one of the two arms; and
   a strut assembly disposed laterally to the car body and controlling turning movement of said crank lever by ascent and descent of the wheel to absorb vibration and impact applied to the wheel from the road surface.

2. The suspension system according to claim 1, wherein said upper control arm is formed in a U-shape and includes a connecting part connected to an upper part of said knuckle by a ball joint, and car body-side connecting parts diverging forward and backward are fixed to the car body by a hinge by inserting an elastic bush therein.

3. The suspension system according to claim 1, wherein the lower control arm is formed in a Y-shape and includes connecting parts diverging forward and backward, and a car body-side connecting part of said connecting parts is connected to the car body and a wheel-side connecting part is connected to a lower part of the knuckle by a ball joint.

4. The suspension system according to claim 1, wherein the two arms of said crank lever includes an upper-side arm and a lower-side arm, and a length a of the upper-side arm is greater than a length b of the lower-side arm and the ratio b:a is larger than 1.

* * * * *